Jan. 21, 1930.  C. M. McCORD  1,744,405
AIR PUMP
Filed Sept. 26, 1927
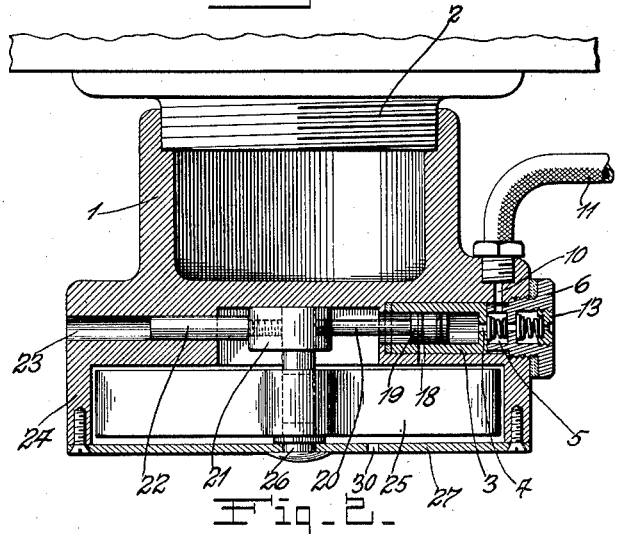
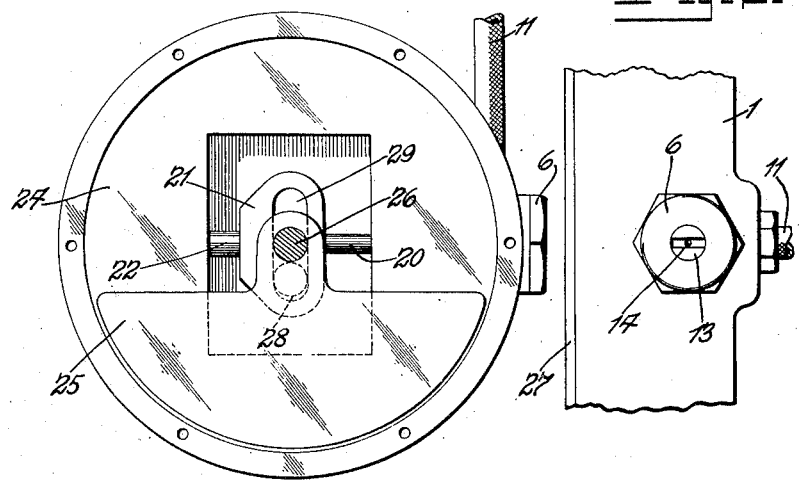
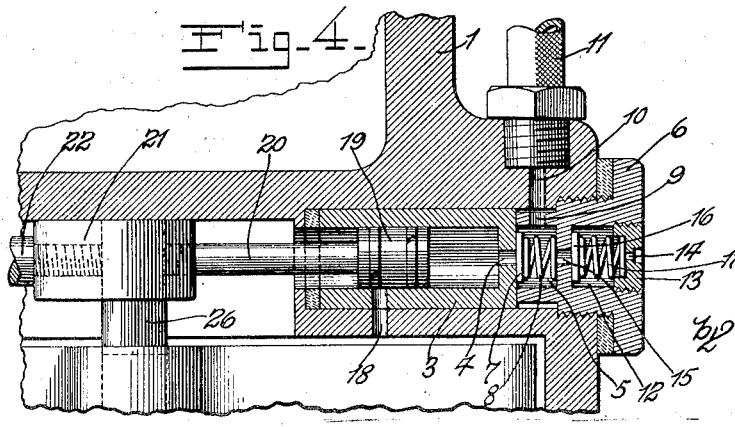
Inventor:
Claude M. McCord,
by Rippey & Kingsland.
His Attorneys.

Patented Jan. 21, 1930

1,744,405

UNITED STATES PATENT OFFICE

CLAUDE M. McCORD, OF RICHMOND HEIGHTS, MISSOURI

AIR PUMP

Application filed September 26, 1927. Serial No. 221,899.

This invention relates to pumps for pneumatic tires and the like.

An object of the invention is to provide a pump adapted to be attached to the hub of a wheel of an automobile and to operate automatically as an incident to the rotation of the wheel to maintain the tire inflated at uniform pressure and to prevent over-inflation.

Another object of the invention is to provide means for relieving the pressure in case of operation of the pump when the tire is inflated to the desired pressure and also to construct the device so that the pump should not function when the tire is inflated properly.

Other objects will appear from the following description, reference being made to the drawing in which Fig. 1 is a cross sectional view of the device attached to the hub of a wheel.

Fig. 2 is an outer side elevation of the device with the outer cover plate removed.

Fig. 3 is a view showing the relief valve structure.

Fig. 4 is an enlarged sectional view of the pump device.

The cup member 1 is designed and adapted to be screwed onto the hub 2 of a wheel in the place of the usual hub cap. The pump mechanism is operatively supported by the cup 1. The outer portion of the cup 1 contains a cylinder 3 open at its inner end and having a port 4 through its outer end opening into a chamber 5 formed in a plug 6 screwed into the side of the cup 1. A valve 7 in the chamber 5 is yieldingly held to close the port 4 by a spring 8. A port 9 through the wall of the chamber 5 communicates with a port 10 through the cup 1 from which a hose or tube 11 leads to the tire (not shown). The plug 6 has a chamber 12 in its outer end in which a plug 13 is screwed, the latter being provided with a port 14. A hole 15 opens through the partition between the chambers 5 and 12 and a valve 16 is yieldingly held in position to close the port 15 by a spring 17. A port 18 opens into the cylinder 3 to admit air thereto.

A piston 19 is mounted in the cylinder 3 and has a rod 20 extending to connection with a block 21 from which a guide pin 22 extends for operation in a hole 23 in the body of the cup 1.

The outer portion of the cup 1 is formed with a chamber 24 in which a weight 25 constituting an actuator for the pump piston 19 is mounted. The weight 25 is pivotally supported on a pin 26 carried by the outer cover plate 27. The pin 28 attached to the weight 25 extends into a slot 29 in the block 21. This pin 28 constitutes a crank for reciprocating the block 21 when the cup and the remaining pump mechanism is rotated with the wheel. For, the weight 25 remains pivotally suspended on its pivot 26, causing the pin 28 to function as a crank and move the block 21 back and forth and thereby operate the piston 19. The movement of the piston 19 is across the port 18 so that said port 18 is successively opened and closed. When the piston 18 is toward the axis of the cup air is admitted to the cylinder 3 through the port 18. And when the piston is moved outwardly the air within the cylinder 3 is forced through the port 4 and through the ports 9 and 10 and the tube 11 to the tire (not shown). The spring 17 will not yield to permit the valve 16 to open until the tire is inflated to the desired pressure. But, when the desired pressure is obtained, the spring 17 will yield if the piston 19 continues to operate so as to prevent over-inflation.

Further, the weight 25 is constructed and designed so that when the desired pressure is obtained said weight will rotate with the cup instead of remaining suspended downwardly from its pivot 26. When the weight 25 rotates with the cup the pump mechanism does not operate, thus causing the pump to fail to function. Air is admitted to the pump through an opening 30 in the plate 27.

From the foregoing it will be seen that, when the pressure created by the operation of the pump exceeds a predetermined maximum, the pressure relief valve 16 will open to prevent increase of pressure. And it is quite apparent that this pressure relief valve is in addition to the provision mentioned for rotating the weight 25 with the body of the device when the pressure exceeds a predetermined maximum. The pressure created by operation of the pump may be varied by variation of the weight 25. For a greater pressure may be obtained by use of an actuator of greater weight.

This device is a self-contained unit of comparatively small dimensions and may be applied to automobiles of present standard and familiar construction simply by substituting the device for the usual hub caps on such automobiles. The device may be made little, if any, larger than the hub caps for which it is to be substituted, so that there is little or no danger of damaging the pump when parking close to high curbs or other elevations, or passing through doors or the like.

The construction, arrangement and relationship of the elements composing the invention may be varied within equivalent limits without departure from the nature and principle of the invention as set forth in the appended claims.

I claim:—

1. A pump comprising, in combination a cup constructed to be screwed on the hub of an automobile wheel instead of the usual hub cap, a pump device supported within the body of said cup, a weight pivotally supported within the body of said cup, and a crank device controlled by said weight for operating the pump.

2. A pump for pneumatic tires comprising, in combination a cup constructed to screw onto the hub of a wheel in substitution for the usual hub cap, an air pump contained within the body of said cup, an actuator for said air pump pivotally supported within the body of said cup and arranged to remain suspended when it is desired to operate the pump and to rotate when it is desired to prevent the pump from operating, and a crank for operating the pump by said actuator.

3. A pump for pneumatic tires comprising, in combination a cup constructed to screw onto the hub of a wheel in substitution for the usual hub cap, an air pump contained within the body of said cup, an actuator for said air pump pivotally supported within the body of said cup and remaining suspended when it is desired to operate the pump and rotating when it is desired to prevent the pump from operating, a crank for operating the pump by said actuator, and a pressure relief valve permitting escape of air pressure from said pump when the pressure exceeds a predetermined maximum.

4. A pump comprising, in combination a cup-like element constructed to be screwed upon the hub of a wheel in substitution for the usual hub cap, a cylinder in the body of said cup having an air outlet opening, a check valve in said opening permitting air to be forced from said cylinder and preventing air from returning to said cylinder from said outlet, a tube for conducting air from said opening, a pressure relief device for conducting air from said opening when the pressure exceeds a predetermined maximum, and an actuator for said pump.

5. A pump comprising, in combination a cup-like element constructed to be screwed upon the hub of a wheel in substitution for the usual hub cap, a cylinder in the body of said cup having an air outlet opening, a check valve in said opening permitting air to be forced from said cylinder and preventing air from returning to said cylinder from said outlet, a tube for conducting air from said opening, a pressure relief device for conducting air from said opening when the pressure exceeds a predetermined maximum, a pivot mounted in the body of said cup, a weight pivoted upon said pivot, and a connection between said weight and said pump for operating said pump by said weight.

6. A pump comprising, in combination a cup-like element constructed to be screwed upon the hub of a wheel in substitution for the usual hub cap, a cylinder in the body of said cup having an air outlet opening, a check valve in said opening permitting air to be forced from said cylinder and preventing air from returning to said cylinder from said outlet, a tube for conducting air from said opening, a pressure relief device for conducting air from said opening when the pressure exceeds a predetermined maximum, a pivot mounted in the body of said cup, a weight pivoted upon said pivot, and a connection between said weight and said pump for operating said pump by said weight swinging said weight about said pivot when the pressure created by operation of the pump exceeds a predetermined maximum.

7. A pump of the character described comprising, in combination a rotary supporting body, a pump cylinder mounted in said body and having an inlet passage and an outlet passage, a piston operative in said cylinder, a check valve permitting air to be forced to said outlet passage by said piston and preventing the return of air to said piston from said outlet passage, a pivot at the axis of said body, a weight suspended upon said pivot, and a crank device connecting said weight and said piston for operating said piston by said weight when said body is rotated.

8. A pump of the character described comprising, in combination a rotary supporting body, a pump cylinder mounted in said body and having an inlet passage and an outlet passage, a piston operative in said cylinder, a check valve permitting air to be forced to said outlet passage by said piston and preventing the return of air to said piston from said outlet passage, a pivot at the axis of said body, a weight suspended upon said pivot, and a crank device connecting said weight and said piston for operating said piston by said weight when said body is rotated and operating to swing said weight about said pivot when the pressure created by the operation of the pump exceeds a predetermined maximum.

9. A pump comprising, in combination a rotary body, a cylinder mounted radially in said body and having an inlet passage and an outlet passage, a piston operative in said cylinder, a pivot mounted axially in said body, a weight pivotally supported upon said pivot, and a crank connection between said weight and said piston for operating said piston by said weight when said body rotates.

10. A pump comprising, in combination a rotary body, a cylinder mounted radially in said body and having an inlet passage and an outlet passage, a piston operative in said cylinder, a pivot mounted axially in said body, a weight pivotally supported upon said pivot, a crank connection between said weight and said piston for operating said piston by said weight when said body rotates, and a device for preventing the pressure created by the operation of said piston from exceeding a predetermined maximum.

11. A pump comprising, in combination a rotary body, a radial cylinder in said body, a piston in said cylinder, a pivot mounted concentrically in said body, a weight pivoted upon said block, a block in said body for operating said piston, and a crank for operating said block by said weight when said body rotates.

CLAUDE M. McCORD.